United States Patent Office 2,953,560
Patented Sept. 20, 1960

2,953,560

TRIAZINE AZO DYESTUFFS

Ronald Baker, Harry Rose Hadfield, Eric Leslie Johnson, and William Elliot Stephen, Manchester, England, assignors to Imperial Chemical Industries Limited, London, England, a corporation of Great Britain No Drawing. Filed June 7, 1957, Ser. No. 664,189

Claims priority, application Great Britain June 15, 1956

3 Claims. (Cl. 260—153)

This invention relates to new azo dyestuffs and more particularly it relates to new water-insoluble azo dyestuffs especially useful for the dyeing of artificial textile fibres.

It has previously been proposed to manufacture azo dyestuffs containing one or more cyanuric nuclei by uniting azo dyestuffs containing appropriate groupings, either to each other, or to other complexes, radicals or suitable residues by reaction with the halogen of cyanuric halides.

When azo dyestuffs containing at least one triazine nucleus carrying at least one halogen atom and which contain ionic solubilising groups such as sulphonic acid or carboxylic acid groups are used for the dyeing of polyamide fibres such as poly-hexamethylene adipamide, they dye the polyamide fibres in colourations which have good fastness to wet treatments, but which are uneven in depth of shade.

No azo dyestuffs have hitherto been described which contain one of more triazine nuclei carrying one halogen atom and which are free from ionic solubilising groups such as sulphonic acid or carboxylic acid groups.

We have now prepared azo dyestuffs which are free from ionic solubilising groups and which contain one or more triazine nuclei carrying one halogen atom and we have found that they may be used as dispersed dyestuffs for the dyeing of polyamide fibres to give colourations having high fastness to wet treatments but which also have a satisfactory levelness of shade.

According to our invention therefore, there are provided the new water-insoluble azo dyestuffs of the formula:

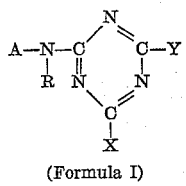

(Formula I)

wherein A stands for the residue of an aromatic azo compound free from sulphonic acid or carboxylic acid groups, R stands for hydrogen or a hydrocarbon radical which may be substituted, X stands for halogen and Y stands for alkyl, aryl, hydroxyl, amino, or for an organic radical containing a nitrogen, oxygen or sulpuhur atom through which it is linked to the triazine ring.

As examples of hydrocarbon radicals represented by R in the above formula there may be mentioned alkyl such as methyl or ethyl, and aryl such as phenyl. As examples of substituents which may be present in the alkyl radicals represented by R or by Y there may be mentioned hydroxyl, alkoxy such as methoxy, cyano and halogen such as fluorine and as examples of substituents which may be present in the aryl radicals represented by R or by Y there may be mentioned alkyl such as methyl, alkoxyl such as methoxy, halogen such as chlorine or bromine.

As examples of halogen represented by X in the above formula there may be mentioned chlorine and bromine, and as examples of the organic radicals containing a nitrogen, oxygen or sulphur atom and represented by Y in the above formula there may be mentioned alkoxy such as methoxy and ethoxy, aryloxy such as phenox, substituted amino such as β-hydroxyethylamino, methylamino, dimethylamino, phenylamino, cyclohexylamino, N-methylphenylamino, β-cyanoethylamino and β-carbethoxyethylamino, and substituted mercapto such as methylmercapto.

The residue of the aromatic azo compound represented by A in the above formula may contain one or more azo groups. The said residue is linked to the triazine nucleus through an amino group, which group may be attached directly to an aromatic nucleus of the said residue or it may be attached to such a nucleus through a chain of atoms which need not all be carbon atoms, for example it may be linked to an alkylene group which is itself linked to an aromatic nucleus through a nitrogen atom.

The water-insoluble azo dyestuffs of Formula I wherein A—NR— stands for a group of formula

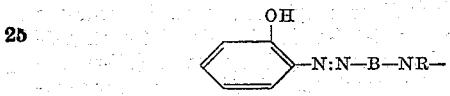

in which B is a benzene ring and in which either or both benzene rings can carry additional substituents, are especially valuable in that they are non-phototropic and have good light fastness.

Also the new water-insoluble azo dyestuffs of Formula I wherein A—NR—stand for a group of formula

C—N:N—D—NR— in which C is a benzene ring carrying an electronegative group in one of the positions ortho or para to the azo group, or a benzthiazol-2-yl or thiazol-2-yl group, and D is a benzene ring and in which any of the benzene rings may carry additional substituents are especially valuable in that they are nonphototropic and have good light fastness. As an example of an electronegative group there may be mentioned the ethanesulphonyl group.

A preferred class of dyestuffs are the water-insoluble azo dyestuffs of the formula:

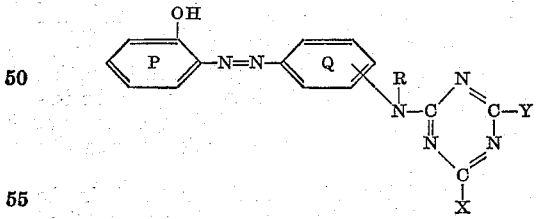

wherein R is selection from the group consisting of a hydrogen atom, lower alkyl, hydroxy-lower alkyl, and lower alkoxy-lower alkyl, X represents a halogen atom selected from the group consisting of chlorine and bromine, Y represents a member selected from the group consisting of lower alkyl, phenyl, hydroxyl, amino, lower alkoxy, phenoxy and lower alkylmercapto, and the benzene rings P and Q may carry substituents other than sulphonic and carboxylic acid groups, and selected from the group consisting of lower alkyl, lower alkoxy, phenyl, hydroxy, chlorine, and bromine.

According to a further feature of the invention we provide a process for the manufacture of the new water-insoluble azo dyestuffs of Formula I wherein Y stands for alkyl, aryl, amino or for an organic radical containing a nitrogen, oxygen or sulphur atom through which it is linked to the triazine ring, which comprises reacting an azo compound free from sulphonic acid or carboxylic acid groups, which contains a primary or secondary amino group, with one molecular proportion of a triazine of the formula:

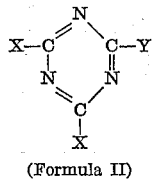

(Formula II)

wherein X is a halogen atom.

As examples of triazines which may be used in the above process there may be mentioned 2:4-dichloro-6-phenoxy-1:3:5-triazine, 2:4-dichloro-6-methoxy-1:3:5-triazine, 2:4-dichloro-6-dimethylamino-1:3:5-triazine, 2:4-dichloro-6-phenylamino-1:3:5-triazine, 2:4-dichloro-6-β-cyanoethylamino-1:3:5-triazine, 2:4-dichloro-6-phenyl-1:3:5-triazine, and 2:4-dichloro-6-methyl-1:3:5-triazine.

As examples of azo compounds which may be used in the above process there may be mentioned aminohydroxyazobenzene derivatives such as 4-amino-2'-hydroxy-5'-methylazobenzene, 4-amino-2'-hydroxy-5'-phenylazobenzene, 4-amino-2':4'-dihydroxyazobenzene, 4-amino-2-methoxy-2'-hydroxy-5'-tert-amylazobenzene, benzene-azo pyrazolones such as 4-(4'-aminophenylazo)-3-methyl-5-pyrazolone, 4-(2'-carbomethoxyphenylazo)-1-(3''-aminophenyl)-3-methyl-5-pyrazolone, 4-(3'-aminophenylazo)-3-carbethoxy-5-pyrazolone, 4-(4'-aminophenylazo)-1-(2''-chlorophenyl)-3-methyl-5-pyrazolone, disazo compounds such as 4-(4'-(4''-aminophenylazo)-3'-methylphenylazo)-phenol and diaminoazo compounds such as 4'-amino-4-dimethylaminoazobenzene, 4:4'-diaminoazobenzene, 4:4'-diamino-2-methyl-5-methoxyazobenzene, 4-(4'-aminophenylazo)-1-naphthylamine, 4'-amino-4-di-(β-hydroxyethyl)amino-2-methylazobenzene, 2'-chloro-4'-nitro-4-(N-β-hydroxyethyl-N-β-aminoethyl)aminoazobenzene, 2'-chloro-4'-ethanesulphonyl-4-(N-β-hydroxyethyl-N-β-aminoethyl)aminoazobenzene and 4'-cyano-2'-trifluoromethyl-4-(N-β-hydroxyethyl-N-β-(β-hydroxyethylamino)-ethyl)aminoazobenzene.

The reaction is preferably carried out in a liquid medium, for example acetone, which is a solvent for both the azo compound and for the triazine, or in a mixture of such a solvent with water. The reaction is preferably carried out at a moderately low temperature, for example at a temperature between 30° C. and 50° C., and in the presence of an acid-binding agent for example sodium carbonate or sodium bicarbonate. The products usually separate as insoluble solids from the reaction medium but, if necessary, may be precipitated by adding water to the reaction medium. They may then be isolated by filtration. It is preferred to dry the products at a relatively low temperature for example between 40° C. and 50° C.

The azo compounds used as starting materials in the process may be obtained either by coupling a diazotised aromatic amine with a coupling component which contains a primary or secondary amine attached thereto or by diazotising a primary aromatic amine which also contains a secondary amino group or a substituent for example a nitro group or an acylamino group such as acetylamino, which may be converted to a primary amino group by known methods, coupling the diazonium compound so obtained with a coupling component, and treating the product as necessary to convert the said substituent to a primary amino group, the reagents in both cases being so chosen that the products are free from sulphonic acid or carboxylic acid groups.

The azo compounds used in the process of the invention may thus be divided into two groups according to whether the primary or secondary amine which condenses with halogen of the triazine is present in that portion of the azo compound which arises from the original diazo component or whether it is present in that portion of the azo compound which arises from the original coupling component. The products of the invention may similarly be divided into two corresponding groups which may conveniently be described as (a) products of the invention which contain a 1:3:5-triazinylamino group attached to the diazo component and (b) products of the invention which contain a 1:3:5-triazinylamino group attached to the coupling component used in the original azo coupling.

It has also been found that compounds of the class (b) just described may be obtained by an alternative process.

As a further feature of the invention there is provided an alternative process for the manufacture of those of the products of the invention which contain a 1:3:5-triazinylamino group attached to the coupling component as hereinbefore defined, which comprises diazotising a primary aromatic amine free from sulphonic acid or carboxylic acid groups and coupling the diazonium compound so obtained with a coupling component of the formula:

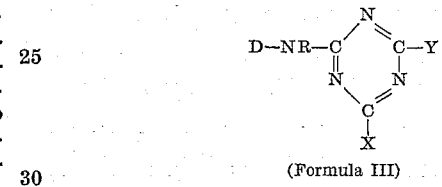

(Formula III)

wherein R, X and Y have the significances as in Formula I and D stands for a radical, free from sulphonic acid or carboxylic acid groups, which contains groups which render the compound D–H capable of coupling with a diazonium compound.

As examples of primary aromatic amines which may be used in this alternative process there may be mentioned homocyclic compounds such as 2-chloro-4-nitroaniline, 2-chloro-4-ethanesulphonylaniline, 4-cyano-2-trifluoromethylaniline, 6-chloro-2:4-dinitroaniline and 3-chloro-4-aminoazobenzene and heterocyclic compounds such as 6-methoxy-2-aminobenzthiazole, 6-ethanesulphonyl-2-aminobenzthiazole and 5-nitro-2-aminothiazole.

The coupling components used in this alternative process may be obtained by interacting a triazine of Formula II with a compound of the formula D—NHR where D and R have the significances given above. The compounds which are used to manufacture the coupling components may contain aromatic tertiary amino groups, aromatic hydroxyl groups, pyrazolone rings or other enolisable radicals such as an acetoacetyl group in addition to the primary or secondary amino group which reacts with the halogen of the triazine. As examples of compounds containing aromatic tertiary amino groups there may be mentioned N-ethyl-N-(β-aminoethyl)aniline,
N-(β-hydroxyethyl)-N-(β-aminoethyl)aniline,
N-β-hydroxyethyl - N - [β-(β-hydroxyethylamino)ethyl]-aniline and
3-N:N-di-(β-hydroxyethyl)-amino-4-methoxyaniline.

As examples of compounds containing aromatic hydroxyl groups there may be mentioned m-aminophenol and 1-amino-7-naphthol. As examples of compounds containing pyrazolone rings there may be mentioned 1-(3'-aminophenyl)-3-methyl-5-pyrazolone and 1-(4'-amino phenyl)-3-methyl-5-pyrazolone. As examples of compounds containing other enolisable radicals there may be mentioned 3-aminoacetoacetanilide.

In forming the coupling components of Formula III used in the above alternative process, the interaction of the appropriate amino compound with the triazine may be carried out in similar media and under similar conditions to those previously described for the interaction of azo compounds and triazines. However, in the alternative process of the invention, the diazotisation and coupling steps should preferably be carried out at a low temperature, for example between 0° C. and 5° C. and at a pH preferably below 10 in order to keep to a minimum the removal by hydrolysis of halogen from the triazine nucleus.

According to a still further feature of the invention there is provided a further alternative process for the manufacture of the new water-insoluble azo dyestuffs excluding those containing alkyl or aryl attached to a carbon atom of the triazine ring which comprises reacting a compound of the formula:

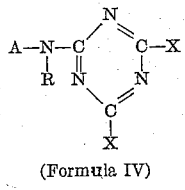

(Formula IV)

with a compound of the formula H.Z wherein A, R and X have the significances given above and Z stands for a hydroxyl group, an amino group or an organic radical containing a nitrogen, oxygen or sulphur atom through which it is linked to the hydrogen atom.

The compounds of the above Formula IV may be obtained by reaction of a cyanuric halide with an azo compound containing an amino or monosubstituted amino group, but free from sulphonic acid or carboxylic acid groups.

Examples of suitable azo compounds which may so be used to obtain the compounds of Formula IV are given above.

Examples of organic radicals containing a nitrogen, oxygen, or sulphur atom and represented by Z are given above.

The reaction conditions for the manufacture of the new water-insoluble azo dyestuffs by the further alternative process are substantially those of the process described above in which an azo compound containing an amino group is reacted with a triazine of Formula II.

For their use in dyeing, the new water-insoluble azo dyestuffs of the invention may be dispersed in aqueous medium by known methods for example by gravel milling with the aid of dispersing agents for example the sodium salt of methylene-dinaphthalene sulphonic acid and, if desired, buffering agents may be added to the dispersions to maintain the pH within a range of 6 to 8 to keep to a minimum the removal by hydrolysis of halogen atoms from the triazine nucleus.

The new water-insoluble azo dyestuffs of our invention may be applied from aqueous dispersion either by printing or dyeing methods to animal fibres such as wool and silk and to cellulose esters such as cellulose acetate and cellulose triacetate and they are particularly useful for application to synthetic fibres for example polyamide fibres such as polyhexamethylene adipamide and the polymer from caprolactam and to polyurethane fibres. When so applied they yield dyeings of yellow, red or blue shades having excellent fastness to wet treatments. Where the products of the invention contain diazotisable primary amino groups as for example the product obtained by interaction of 2:4-dichloro-6-methoxy-1:3:5-triazine with one molecular proportion of 4:4'-diaminoazobenzene they may be applied to one of the textile fibres described and then diazotised on the fibre and coupled with a suitable coupling component, for example 2-hydroxy-3-naphthoic acid. In this way valuable shades, for example navy blues and blacks may be obtained.

The invention is illustrated but not limited by the following Examples in which parts and percentages are by weight:

EXAMPLE 1

37.5 parts of 2-hydroxy-5-methyl-4'-(4:6-dichloro-1:3:5-triazin-2-ylamino)azobenzene obtained as described below are stirred with 450 parts of acetone and 12.2 parts of monoethanolamine are added. The mixture is heated to 40° C. for 1 hour, then cooled to 20° C. and 450 parts of water are added slowly. The precipitated product is filtered off, washed with water and dried.

When dispersed in aqueous medium the product, 2-hydroxy-5-methyl-4'-(4-chloro-6-$\beta$-hydroxyethylamino-1:3:5-triazin-2-ylamino)azobenzenes, dyes cellulose acetate rayon and nylon in yellow shades of good fastness to washing.

The 2-hydroxy-5-methyl-4'-(4:6-dichloro-1:3:5-triazin-2-ylamino)azobenzene used as starting material in this example may be obtained as follows:

A solution of 18.5 parts of cyanuric chloride in 300 parts acetone is added dropwise with stirring to 300 parts of water at a temperature below 5° C. To the slurry of cyanuric chloride so obtained there are simultaneously added at a slow rate a solution of 22.7 parts of 2-hydroxy-5-methyl-4'-aminoazobenzene in 200 parts of acetone and a solution of 5.3 parts of anhydrous sodium carbonate in 200 parts of water keeping the temperature of the mixture below 5° C. The mixture is stirred for 3 hours below this temperature and the insoluble product then filtered off, washed with water and dried.

EXAMPLE 2

If in the process of Example 1 21 parts of diethanolamine are used in place of the monoethanolamine, the product obtained is 2-hydroxy-5-methyl-4'-[4-chloro-6-di-($\beta$-hydroxyethyl)amino-1:3:5-triazin-2-ylamino]azobenzene, which dyes cellulose acetate rayon and nylon from finely-divided aqueous dispersions in yellow shades of good fastness to washing.

EXAMPLE 3

If in the process of Example 1 9 parts of dimethylamine are used in place of the monoethanolamine the product obtained is 2-hydroxy-5-methyl-4'-(4-chloro-6-dimethylamino-1:3:5-triazin-2-ylamino)azobenzene. This dyes cellulose acetate rayon and nylon from finely-divided aqueous dispersions in yellow shades of good fastness to washing.

EXAMPLE 4

If in the process of Example 1 9 parts of monoethylamine are used in place of the monoethanolamine the product obtained is 2-hydroxy-5-methyl-4'-(4-chloro-6-ethylamino-1:3:5-triazin-2-ylamino)azobenzene. It dyes cellulose acetate rayon and nylon from finely-divided aqueous dispersions in yellow shades of good fastness to washing.

EXAMPLE 5

If in the process of Example 1 18.6 parts of aniline are used in place of the monoethanolamine the product obtained is 2-hydroxy-5-methyl-4'-(4-chloro-6-anilino-1:3:5-triazin-2-ylamino)azobenzene. It dyes cellulose acetate rayon and nylon from finely-divided aqueous dispersions in yellow shades of good fastness to washing.

EXAMPLE 6

37.5 parts of 2-hydroxy-5-methyl-4'-(4:6-dichloro-1:3:5-triazin-2-ylamino)azobenzene are stirred with 400 parts of acetone and 38.6 parts of 5 N ammonium hydroxide solution are added. The mixture is heated to 50° C. and maintained at that temperature for 1½ hours. The mixture is then cooled to 20° C. and 800 parts of water are added slowly. The precipitated product is filtered off, washed with water and dried.

The product is 2-hydroxy-5-methyl-4'-(4-chloro-6-amino-1:3:5-triazin-2-ylamino)azobenzene. It dyes cellulose acetate rayon and nylon from finely-divided aqueous dispersions in yellow shades of good fastness to washing.

EXAMPLE 7

37.5 parts of 2-hydroxy-5-methyl-4'-(4:6-dichloro-1:3:5-triazin-2-ylamino)azobenzene are stirred with 450 parts of water and 216 parts of 7.5% aqueous sodium hydroxide solution are added. The mixture is heated to 70° C. and maintained at this temperature for 2 hours. The mixture is then cooled and made slightly acid to Congo Red paper by addition of hydrochloric acid. The product is filtered off, washed acid free with water and dried.

The product is substantially 2-hydroxy-5-methyl-4'-(4-chloro-6-hydroxy-1:3:5-triazin-2-ylamino)azobenzene. It dyes cellulose acetate rayon and nylon from finely-divided aqueous suspensions in yellow shades of good fastness to washing.

EXAMPLE 8

37.5 parts of 2-hydroxy-5-methyl-(4:6-dichloro-1:3:5-triazin-2-ylamino)azobenzene are stirred with 400 parts of water. 9.4 parts of phenol and 5.3 parts of anhydrous sodium carbonate are then added. The mixture is heated to 65° C. and stirred at this temperature for 1½ hours. The mixture is then cooled and the product which separates is filtered off, washed with water and dried.

The product obtained is 2-hydroxy-5-methyl-4'-(4-chloro-6-phenoxy - 1:3:5-triazin-2-ylamino)azobenzene. It dyes cellulose acetate rayon and nylon from finely-divided aqueous dispersions in yellow shades of good fastness to washing.

EXAMPLE 9

55.8 parts of 2-chloro-4-ethanesulphonyl-4'-N-$\beta$-hydroxyethyl-N-$\beta$-(4:6-dichloro-1:3:5 - triazin-2-ylamino)-ethylaminoazobenzene are stirred with 280 parts of water and 54 parts of 7.5% aqueous sodium hydroxide solution. The mixture is heated to 90° C. and stirred at this temperature for 12 hours. The mixture is cooled and made slightly acid to Congo Red paper by addition of sulphuric acid. The product is filtered off, washed and dried.

The product is 2-chloro-4-ethanesulphonyl-4'-N-$\beta$-hydroxyethyl - N - $\beta$ - (4-chloro-6-hydroxy-1:3:5-triazin-2-ylamino)-ethylaminoazobenzene. It dyes cellulose acetate rayon and nylon from finely-divided aqueous dispersions in orange shades of good fastness to washing.

EXAMPLE 10

55.8 parts of the azo compound used in Example 9 are stirred with 450 parts of acetone and 12.2 parts of monoethanolamine are added. The mixture is heated and stirred at a temperature of 40° C. for 1 hour, then cooled to 20° C. and 450 parts of water are added slowly. The precipitated product is then filtered off, washed with water and dried.

The product obtained is 2-chloro-4-ethanesulphonyl-4'-N - $\beta$ - hydroxyethyl-N-$\beta$-(4-chloro-6-$\beta$-hydroxyethylamino - 1:3:5 - triazin - 2 - ylamino)ethylaminoazobenzene. It dyes cellulose acetate rayon and nylon from finely-divided aqueous dispersions in orange shades of good fastness to washing.

EXAMPLE 11

If, in the process of Example 1, 48.6 parts of 2-chloro-4-ethanesulphonyl-2'-methyl-4' - (4:6 - dichloro - 1:3:5-triazin - 2 - ylamino)azobenzene are used in place of the 2-hydroxy - 5 - methyl - 4'-(4:6-dichloro-1:3:5-triazin-2-ylamino)azobenzene the product obtained is 2-chloro-4-ethanesulphonyl - 2' - methyl-4'-(4-chloro-6-$\beta$-hydroxyethylamino - 1:3:5 - triazin - 2 - ylamino)azobenzene. It dyes cellulose acetate rayon and nylon in reddish yellow shades of good fastness to washing.

EXAMPLE 12

If, in the process of Example 1, 35.9 parts of 4-(4:6-dichloro - 1:3:5 - triazin-2-ylamino)-2-methylazobenzene are used in place of the 2-hydroxy-5-methyl-4'-(4:6-dichloro - 1:3:5 - triazin-2-ylamino)azobenzene the product obtained is 4-(4-chloro-6-$\beta$-hydroxyethylamino - 1:3:5-triazin-2-ylamino)-2-methylazobenzene. It dyes cellulose acetate rayon and nylon from finely-divided dispersions in yellow shades of good fastness to washing.

EXAMPLE 13

41.8 parts of the product prepared as described below are stirred with 600 parts of acetone and 12.2 parts of monoethanolamine are added. The mixture is heated to 45° C. and stirred at this temperature for 2½ hours. The mixture is then cooled and 600 parts of water are added slowly. The mixture is stirred for several hours and then the product which separates is filtered off, washed with water and dried.

The product obtained is 4-nitro-4'-N-ethyl-N-(4-chloro-6 - $\beta$ - hydroxyethylamino - 1:3:5 - triazin - 2 - ylamino)-azobenzene. It dyes cellulose acetate rayon and nylon from finely-divided aqueous dispersions in orange shades of good fastness to washing. The product used as starting material in the above example may be prepared as follows:

18.5 parts of cyanuric chloride are dissolved by stirring with 225 parts of acetone at 20° C. A solution of 27 parts of 4-nitro-4'-ethylaminoazobenzene in 450 parts of acetone is added during 30 minutes. A solution of 5.3 parts of sodium carbonate in 150 parts of water is then added dropwise keeping the temperature between 20° C. and 22° C. The mixture is then stirred for 1½ hours at this temperature. The product which separates is then filtered off and the residue on the filter is stirred with 300 parts of cold water for 30 minutes. The product is then filtered off, washed with water and dried.

EXAMPLE 14

41.1 parts of 1-[4-(4:6-dichloro-1:3:5-triazin-2-ylamino)phenylazo]-2-naphthol are stirred with 700 parts of acetone and 12.2 parts of monoethanolamine are added. The mixture is heated to 45° C. and stirred at that temperature for 1½ hours. The mixture is then cooled and 1400 parts of water are added slowly. The precipitated product is filtered off, washed with water and dried.

The product obtained is 1-[4-(4-chloro-6-$\beta$-hydroxyethylamino - 1:3:5 - triazin - 2 - ylamino) - phenylazo]-2-naphthol. It dyes cellulose acetate rayon and nylon from finely-divided aqueous dispersions in red shades of good fastness to washing.

EXAMPLE 15

If in the process of Example 14, 21 parts of diethanolamine are used in place of the monoethanolamine, the product obtained is 1-[4-(4-chloro-6-di-($\beta$-hydroxyethyl)amino - 1:3:5 - triazin - 2 - ylamino) - phenylazo] - 2-naphthol. It dyes cellulose acetate rayon and nylon from finely-divided aqueous dispersions in red shades of good fastness to washing.

EXAMPLE 16

47.4 parts of 4-(4-sulphamylphenylazo)-1-(4:6-dichloro-1:3:5-triazin-2-ylamino)naphthalene are stirred with 800 parts of acetone and 12.2 parts of monoethanolamine are added. The mixture is heated to 50° C. and stirred at this temperature for 3½ hours. The mixture is cooled and 1600 parts of water added slowly. The product which separates is filtered off, washed with water and dried.

The product is 4-(4-sulphamylphenylazo)-1-(4-chloro-6 - $\beta$ - hydroxyethylamino - 1:3:5 - triazin - 2 - ylamino)-naphthalene. It dyes cellulose acetate rayon and nylon from finely-divided aqueous dispersions in orange shades of good fastness to washing.

The 4 - (4 - sulphamylphenylazo) - 1 - (4:6 - dichloro-1:3:5-triazin-2-ylamino)naphthalene used in the above example may be obtained as follows:

18.5 parts of cyanuric chloride are dissolved in 300 parts of acetone and the solution is added dropwise to 300 parts of water at 0° C. A solution made by dissolving 32.6 parts of 4-(4-sulphamylphenylazo)-1-naphthylamine in a mixture of 900 parts of acetone, 600 parts of water and 4 parts of sodium hydroxide, is added slowly to the suspension of cyanuric chloride keeping the temperature below 5° C. The mixture is stirred for 3 hours at a temperature below 5° C. The precipitated product is then filtered off, washed with water and dried.

EXAMPLE 17

If in the process of Example 16, 21 parts of diethanolamine are used in place of the monoethanolamine, the product obtained is 4-(4-sulphamylphenylazo)-1-(4-chloro - 6 - di - ($\beta$ - hydroxyethyl)amino - 1:3:5 - triazin-2-ylamino)naphthalene. It dyes cellulose acetate rayon and nylon from finely-divided aqueous dispersions in orange shades of good fastness to washing.

EXAMPLE 18

39.5 parts of 1-(4:6-dichloro-1:3:5-triazin-2-ylamino)-4-phenylazonaphthalene are stirred with 1000 parts of dioxan and 12.2 parts of monoethanolamine are added. The mixture is heated to 45° C. and stirred at this temperature for 1 hour. The mixture is then cooled to 10° C. and 1000 parts of water are added slowly. The precipitated product is filtered off, washed with water and dried. When dispersed in aqueous medium the product, 1-(4-chloro-6-$\beta$-hydroxyethylamino-1:3:5-triazin-2-ylamino)-4-phenylazonaphthalene, dyes cellulose acetate rayon and nylon in orange shades of good fastness to washing.

EXAMPLE 19

44.4 parts of 4-(4:6-dichloro-1:3:5-triazin-2-ylamino)-phenylazoacetoacetanilide are stirred with 1000 parts of acetone and 12.2 parts of monoethanolamine are added. The mixture is stirred for 2 hours at a temperature between 20° C. and 25° C., then heated to 45° C. and stirred at this temperature for 1 hour. The mixture is then cooled to 10° C. and 1000 parts of water are added slowly. The precipitated product is filtered off, washed with water and dried. When dispersed in aqueous medium the product, 4 - (4 - chloro - 6 - $\beta$ - hydroxyethylamino-1:3:5-triazin-2-ylamino)phenylazoacetoacetanilide, dyes cellulose acetate rayon and nylon in greenish-yellow shades of good fastness to washing.

EXAMPLE 20

If in the process of Example 19 44.1 parts of 4-[4-(4:6-dichloro-1:3:5-triazin-2 - ylamino)phenylazo] - 1 - phenyl-3-methyl-5-pyrazolone are used in place of the 4-(4:6-dichloro-1:3:5-triazin - 2 - ylamino)phenylazoacetoacetanilide a product, 4-[4-(4-chloro-6-$\beta$-hydroxyethylamino-1:3:5-triazin-2-ylamino)phenylazo]-1-phenyl - 3 - methyl-5-pyrazolone, is obtained which, when dispersed in aqueous medium, dyes cellulose acetate rayon and nylon in yellowish orange shades of good fastness to washing.

EXAMPLE 21

36.1 parts of 4-(4:6-dichloro-1:3:5-triazin-2-ylamino)-4'-hydroxyazobenzene are stirred with 800 parts acetone and 400 parts of water, and 12.8 parts of monoethanolamine are added. The mixture is stirred for 1 hour at a temperature between 20° C. and 25° C., then heated to 45° C. and maintained at this temperature for 2 hours. The mixture is then cooled to 10° C. and 1200 parts of water are added slowly. The precipitated product is filtered off, washed with water and dried. When dispersed in aqueous medium the product, 4-(4-chloro-6-$\beta$-hydroxyethylamino-1:3:5-triazin - 2 - ylamino) - 4' - hydroxyazobenzene, dyes cellulose acetate rayon and nylon in yellow shades of good fastness to washing.

EXAMPLE 22

37.5 parts of 2 - hydroxy-5-methyl - 4' - (4:6 - dichloro-1:3:5 - triazin - 2 - ylamino)azobenzene, 19.5 parts of N-methyl - d - glucamine(6 - methylaminohexane-1:2:3:4:5-pentaol) and 8.4 parts of sodium bicarbonate are stirred with 650 parts of acetone and 200 parts of water. The mixture is heated at a temperature between 45° C. and 50° C. for 2½ hours, and then cooled to 20° C. The precipitated product is filtered off, washed with cold water and dried. The compound so obtained is 2-hydroxy-5-methyl-4'-(4-chloro-6-N-methylglucamyl - 1:3:5-triazin-2-ylamino)azobenzene, which, when dispersed in aqueous medium, dyes nylon in yellow shades of good fastness to washing.

EXAMPLE 23

31.75 parts of cyanuric bromide are dissolved in 1000 parts of dioxan by warming to 50° C. The solution is then stirred and cooled to 10° C. The solution obtained by dissolving 22.7 parts of 2-hydroxy-5-methyl-4'-aminoazobenzene in 250 parts of dioxan is then added dropwise with stirring at 10° C. The mixture is stirred for ½ hour at 10° C. and then 1000 parts of cold water are added dropwise followed by sufficient 2 N aqueous sodium carbonate solution to neutralise the acid liberated. After stirring for ½ hour the product is filtered off, washed with water and dried at 40° C. 46.4 parts of the 2-hydroxy-5-methyl-4' - (4:6 - dibromo - 1:3:5 - triazin-2-ylamino)azobenzene so obtained are stirred with 575 parts of acetone and 20.8 parts of diethanolamine are added. The solution is heated to 40° C. for 1 hour, then cooled to 20° C. 700 parts of cold water are added, and the mixture is stirred for ½ hour. The product is filtered off, washed with cold water and dried. The compound so obtained is 2-hydroxy-5-methyl-4'-(4-bromo-6-N:N-di($\beta$-hydroxyethyl)amino-1:3:5 - triazin - 2 - ylamino)azobenzene when dispersed in aqueous medium dyes nylon in yellow shades of good fastness to washing.

EXAMPLE 24

22.7 parts of 4 - amino-2'-hydroxy-5'-methylazobenzene are dissolved in 250 parts of acetone and there are then added 18 parts of 2:4-dichloro-6-methoxy-1:3:5-triazine followed by 9.24 parts of sodium bicarbonate. The mixture is stirred and heated to 40° C. and maintained at this temperature for 30 minutes. The reaction mixture is then cooled to 20° C. and 250 parts of cold water are added dropwise. The mixture is then stirred at room temperature for 30 minutes, filtered, and the residue is washed with 250 parts of a 1:1 mixture of acetone and water and then with water until washings are alkali-free. The residue is dried at a temperature between 40° C. and 50° C. The 2-hydroxy-5-methyl-4'-(4-chloro - 6 - methoxy-1:3:5-triazin-2-ylamino)azobenzene so obtained dyes nylon, from a finely-dispersed aqueous suspension, to give yellow shades of good fastness to washing.

EXAMPLE 25

22.7 parts of 2-hydroxy-5-methyl-4'-aminoazobenzene, 22.6 parts of 2-phenyl-4:6-dichloro-1:3:5-triazine, 8.4 parts of sodium bicarbonate and 325 parts of acetone are stirred and heated at 50° C. for 1½ hours. 800 parts of water are then added and the mixture is heated for 30 minutes at 50° C. The mixture is then cooled to 40° C. and the product is filtered off, washed with water and dried. The product so obtained, 2-hydroxy-5-methyl-4'-(4-chloro-6-phenyl-1:3:5-triazin - 2-ylamino)azobenzene, dyes nylon, from aqueous dispersion, in yellow shades of good fastness to washing.

EXAMPLE 26

21.2 parts of 4:4'-diaminoazobenzene, 24.2 parts of 2:4-dichloro-6-phenoxy-1:3:5-triazine and 8.4 parts of sodium bicarbonate are stirred with 165 parts of acetone and the mixture is heated at a temperature between 45° C. and 50° C. for 1 hour. The mixture is cooled to 20° C. and 800 cc. of water added slowly. After stirring for 18 hours the product is filtered off, washed with cold water and dried. The compound so obtained 4-amino-4'-(4-chloro-6-phenoxy-1:3:5-triazin - 2-ylamino)azobenzene dyes nylon, from aqueous dispersion, in yellow shades of good fastness to washing. The yellow dyeing obtained is immersed for ½ hour in water at 15° C. containing 0.3% of sodium nitrite and 0.3% of hydrogen chloride and then immersed for ½ hour in water at 80° C. containing 0.1% of 2-hydroxy-3-naphthoic acid and acetic acid sufficient in quantity to bring the pH to between 4.5 and 5. The yellow dyeing is converted into a reddish blue dyeing of good fastness to washing.

EXAMPLE 27

A solution of 6.9 parts of sodium nitrite in 50 parts of water is added slowly at 10° C. to a stirred solution of 21.95 parts of 2-chloro-4-ethylsulphonylaniline and 25 parts of 36% aqueous hydrochloric acid in 100 parts of acetic acid. After standing for 10 minutes 100 parts of water are added and the solution of the diazonium compound so obtained is added, at a temperature below 10° C., to a stirred solution in 400 parts of acetone of 32.35 parts of the compound obtained by reacting together equimolecular amounts of 2:4-dichloro-6-methoxy-1:3:5-triazine and N-(β-hydroxyethyl-N)-(β-aminoethyl)aniline in acetone in the presence of sodium bicarbonate. A solution of 6.15 parts of anhydrous sodium acetate in 75 parts water is then added and the mixture is stirred for 24 hours. The mixture is then filtered and the product is washed with water and dried at a temperature between 40° C. and 50° C. The product so obtained dyes nylon from a finely-dispersed aqueous suspension to give orange shades of good fastness to washing.

The following table contains further examples of products of the invention which may be obtained by coupling a diazotised primary aromatic amine free from sulphonic acid or carboxylic acid groups with a coupling component of Formula III as hereinbefore defined.

| Example No. | Diazo Component | Coupling Component | Shade of product dyed on nylon |
|---|---|---|---|
| 28 | 4-amino-3-chloro-azobenzene. | 3-(4-chloro-6-β-hydroxyethyl-amino-1:3:5-triazin-2-ylamino)-N:N-diethylaniline. | Rubine. |
| 29 | 2:4-bis-methyl-sulphonylaniline. | ----do---- | Reddish-violet. |
| 30 | 2-chloro-4-ethyl-sulphonylaniline. | ----do---- | Pink. |
| 31 | 4-nitroaniline. | ----do---- | Reddish-violet. |
| 32 | 2-chloro-4-ethyl-sulphonylaniline. | 3-[4-chloro-6-N:N-di(β-hydroxyethyl) amino-1:3:5-triazin-2-ylamino]-N:N-di-(β-hydroxyethyl) aniline. | Red. |
| 33 | ----do---- | N-β-(4-chloro-6-β-hydroethylamino-1:3:5-triazin-2-ylamino)-ethyl-N-ethylaniline. | Orange. |
| 34 | 2-amino-5-cyano-benzotrifluoride. | ----do---- | Bluish-red. |
| 35 | 2-amino-5-ethyl-sulphonylbenzotrifluoride. | ----do---- | Pink. |
| 36 | 2-amino-6-ethoxy-benzthiazole. | ----do---- | Bluish-red. |
| 37 | 2:5-dichloro-4-amino-benzene-sulphon-N-methylamide. | N-β-(4-chloro-6-β-hydroxyethyl-amino-1:3:5-triazin-2-ylamino)ethyl-N-β-hydroxyethyl aniline. | Red. |
| 38 | 2:4-bis-methyl-sulphonylaniline. | ----do---- | Pink. |
| 39 | 4-aminobenzene-sulphonamide. | 1-[4-chloro-6-N:N-di-(β-hydroxyethyl) amino-1:3:5-triazin-2-ylamino]-7-naphthol. | Red. |
| 40 | 4-acetylamino-aniline. | ----do---- | Do. |
| 41 | 4-aminophenyl-β-hydroxyethyl ether. | ----do---- | Bluish-red. |
| 42 | Aniline. | 1-m-(4-chloro-6-β-hydroxyethyl-amino-1:3:5-triazin-2-ylamino) phenyl-3-methyl-5-pyrazolone. | Yellow. |
| 43 | 2:4-bis-methyl-sulphonylaniline. | N-β-[4-chloro-6-N-methylglucamyl-1:3:5-triazin-2-ylamino]-ethyl-N-ethylaniline. | Pink. |

The coupling components of Formula III mentioned in the above table may be obtained by the following methods:

*N-β-(4-chloro - 6-β-hydroxyethylamino - 1:3:5-triazin-2-ylamino)-ethyl-N-ethylaniline*

A solution of 18.45 parts of cyanuric chloride in 125 parts of acetone is added to 150 parts of water at 0° C. To the slurry so obtained is added 16.4 parts of N-ethyl-N-β-aminoethylaniline dissolved in 125 parts of acetone keeping the temperature below 10° C. 10% sodium carbonate solution in water is added simultaneously to maintain neutrality. The insoluble N-β-(4:6-dichloro-1:3:5-triazin-2-ylamino)-ethyl-N-ethylaniline is filtered off and washed with water. 31.2 parts of the dried product are stirred with 200 parts of acetone and 12.2 parts of monoethanolamine is added. The mixture is heated at 45° C. for 1 hour. To the cooled mixture is then added 600 parts of cold water to precipitate the product. After stirring 1 hour the product is filtered off, washed until alkali free with water and dried. The N-β-(4-chloro-6-β-hydroxyethylamino-1:3:5-triazin - 2-ylamino)-ethyl-N-ethylaniline so obtained is a white solid, melting at a temperature between 178° C. and 179° C.

*N - β - (4 - chloro - 6 - β - hydroxyethylamino - 1:3:5-triazin-2-ylamino)-ethyl-N-β-hydroxyethylaniline*

In the above process 18 parts of N-β-hydroxyethyl-N-β'-aminoethyl aniline are used in place of N-ethyl-N-β-aminoethylaniline the product obtained is N-β-(4-chloro-6-β-hydroxyethylamino-1:3:5-triazin - 2 - ylamino) -ethyl-N-β-hydroxyethylaniline, melting at 140° C.

*N - β - (4 - chloro - 6 - N - methylglucamyl-1:3:5-triazin-2-ylamino)-ethyl-N-ethylaniline*

31.2 parts of N-β-(4:6 - dichloro - 1:3:5 - triazin - 2-ylamino)-ethyl-N-ethylaniline, 19.5 parts of N-methyl-glucamine and 8.4 parts of sodium bicarbonate are stirred with a mixture of 165 parts of acetone and 100 parts of water. The mixture is heated at a temperature between 45° C. and 50° C. for 1½ hours. After cooling to 20° C. the product is filtered off, washed with cold water and dried. The compound so obtained is N-β-[4-chloro-6-N - methylglucamyl - 1:3:5-triazin-2-ylamino] - ethyl - N-ethylaniline, melting at a temperature between 176° C. and 177° C.

*1 - [4 - chloro - 6 - N:N - di(β - hydroxyethyl)amino-1:3:5-triazin-2-ylamino]-7-naphthol*

18.45 parts of cyanuric chloride are dissolved in 165 parts of acetone and added dropwise with stirring into 200 parts of water at 0° C. 15 parts of 1-amino-7-naphthol and 4 parts of sodium hydroxide are dissolved in 200 parts of water and the resulting solution is added dropwise to the suspension of cyanuric chloride keeping the temperature below 0° C. After completion of addition the mixture is stirred for 1 hour at 0° C. The product is then filtered off and dried. 30.7 parts of the 1-(4:6-dichloro-1:3:5-triazin-2-ylamino)-7-naphthol so obtained are stirred with 200 parts of acetone, 19 parts of diethanolamine and 50 parts of water. The mixture is heated at 40° C. for 1¾ hours after which it is cooled to 20° C. and the product precipitated by slow addition of 1000 parts of cold water. The product after filtration, washing with water, and drying is 1-[4-chloro-6-N:N-di-(β-hydroxyethyl)amino - 1:3:5 - triazin - 2 - ylamino]-7-naphthol, melting at a temperature between 175° C. and 177° C.

*1 - m - (4 - chloro - 6 - β - hydroxyethylamino - 1:3:5-triazin-2-ylamino)-phenyl-3-methyl-5-pyrazolone*

To a suspension of 18.45 parts cyanuric chloride in 165 parts of acetone and 200 parts of water at 0° C. is added the solution obtained by dissolving 22.65 parts of the hydrochloride of 1-m-aminophenyl-3-methyl-5-pyrazolone, 4 parts of sodium hydroxide and 5.3 parts of sodium carbonate in 400 parts of water, keeping the temperature below 5° C. After stirring for 1 hour at a temperature between 0° C. and 5° C. the product is filtered off, washed with water and dried. 33.7 parts of 1-m-(4:6-dichloro-1:3:5 - triazin - 2 - ylamino)phenyl-3-methyl-5-pyrazolone so obtained are stirred with 165 parts of acetone and 12.2 parts of monoethanolamine are added. The mixture is heated at a temperature between 45° C. and 50° C. for 2 hours. It is then cooled to 20° C. and 600 parts of water are added slowly. The mixture is stirred for 18 hours and the product is filtered off and dried. The compound so obtained is 1-m-(4-chloro-6-β-hydroxyethylamino - 1:3:5 - triazin-2-ylamino)phenyl-3-methyl-5-pyrazolone.

*3 - [4 - chloro - 6 - N:N - di -(β - hydroxyethyl)amino-1:3:5-triazin-2-ylamino]N:N-di-(β-hydroxyethyl)aniline*

To a suspension of 18.45 parts of cyanuric chloride in 115 parts of acetone and 140 parts of water at 0° C. are added simultaneously a solution of 19.6 parts of 3-amino-N:N-di-(β-hydroxyethyl)aniline in 165 parts of acetone and a solution of 5.3 parts of sodium carbonate in 200 parts of water keeping the temperature below 5° C. After stirring for 1 hour the product is filtered off and dried. 34.4 parts of the 3-(4:6-dichloro-1:3:5-triazin-2-ylamino)-N:N-di-(β-hydroxyethyl)aniline so obtained are stirred with 245 parts of acetone, and 30 parts of water and 20.8 parts of diethanolamine are added. The mixture is heated at 45° C. for 1½ hours. The resulting solution of 3-[4-chloro-6-N:N-di(β-hydroxyethyl)amino-1:3:5 - triazin-2-ylamino] - N:N-di-(β-hydroxyethyl)aniline after cooling and further dilution with acetone is used for dyestuff preparation.

*3 - (4 -chloro - 6 - β - hydroxyethylamino - 1:3:5 - triazin-2-ylamino)-N:N-diethylaniline*

A solution of 16.4 parts of 3-amino-N:N-diethylaniline in 80 parts of acetone is added dropwise to a solution of 18.45 parts of cyanuric chloride in 160 parts of acetone at a temperature between 0° C. and 5° C. The solid which separates, the hydrochloride of 3-(4:6-dichloro-1:3:5-triazin-2-ylamino)-N:N-diethylaniline, is filtered off and dried. The free base is obtained by dissolving the hydrochloride in water, adding sufficient sodium carbonate to make alkaline to Brilliant Yellow and extracting the base with benzene. After removing the benzene, the residue is crystallised from petrol to give 3-(4:6-dichloro-1:3:5-triazin-2-ylamino)-N:N-diethylaniline, melting at a temperature between 107° C. and 108° C.

A solution of 12.2 parts of ethanolamine in 80 parts of acetone is added dropwise to a solution of 31.2 parts of 3-(4:6-dichloro-1:3:5 - triazin - 2 - ylamino-N:N-diethylaniline in 120 parts of acetone at a temperature between 20° C. and 25° C., and the mixture is stirred 1 hour at this temperature and then at a temperature between 40° C. and 45° C. for a further 1 hour. After cooling to 10° C., 750 parts of water are added and the solid product filtered off and dried. After crystallisation from benzene, 3-(4-chloro-6-β-hydroxyethylamino-1:3:5-triazin-2-ylamino)-N:N-diethylaniline melting at a temperature between 139° C. and 143° C. is obtained.

What we claim is:

1. Water-insoluble azo dyestuffs of the formula:

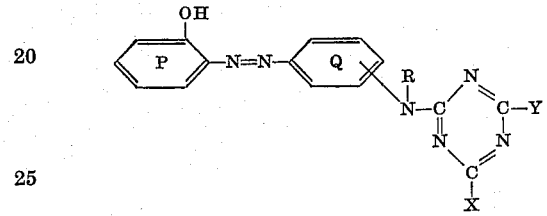

wherein R is selected from the group consisting of a hydrogen atom, lower alkyl, hydroxy-lower alkyl, and lower alkoxy-lower alkyl, X represents a halogen atom selected from the group consisting of chlorine and bromine, Y represents a member selected from the group consisting of lower alkyl, phenyl, hydroxyl, amino, lower alkoxy, phenoxy and lower alkylmercapto, and the benzene rings P and Q carry substituents other than sulphonic and carboxylic acid groups, and selected from the group conisting of hydrogen, lower alkyl, lower alkoxy, phenyl, hydroxy, chlorine, and bromine.

2. The water-insoluble azo dyestuff of the formula:

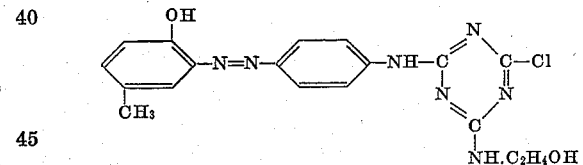

3. The water-insoluble azo dyestuff of the formula:

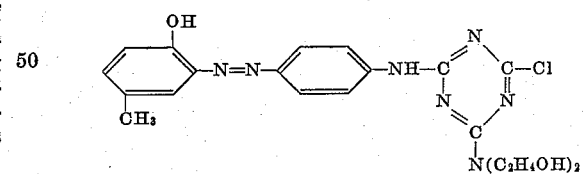

References Cited in the file of this patent

UNITED STATES PATENTS

| | | |
|---|---|---|
| 1,667,312 | Fritzsche et al. | Apr. 24, 1928 |
| 2,211,709 | Zerwick et al. | Aug. 13, 1940 |
| 2,258,977 | Dickey et al. | Oct. 14, 1941 |
| 2,270,478 | Schmid | Jan. 20, 1942 |
| 2,273,115 | Kracker et al. | Feb. 17, 1942 |
| 2,273,117 | Kranzlein et al. | Feb. 17, 1942 |
| 2,392,649 | D'Alelio et al. | Jan. 8, 1946 |
| 2,418,336 | D'Alelio et al. | Apr. 1, 1947 |
| 2,444,013 | Thurston | June 22, 1948 |